(12) United States Patent
Sawaguchi et al.

(10) Patent No.: US 8,703,311 B2
(45) Date of Patent: Apr. 22, 2014

(54) VEHICLE BATTERY COOLING DEVICE

(75) Inventors: Masaru Sawaguchi, Saitama (JP); Kenichi Koui, Yuki (JP); Kazuhiko Matsumoto, Kazo (JP); Yoshikazu Takamatsu, Sano (JP)

(73) Assignee: Calsonic Kansei Corporation, Saitama-shi (JP)

( * ) Notice: Subject to any disclaimer, the term of this patent is extended or adjusted under 35 U.S.C. 154(b) by 507 days.

(21) Appl. No.: 12/864,133

(22) PCT Filed: Feb. 24, 2009

(86) PCT No.: PCT/JP2009/053270
§ 371 (c)(1), (2), (4) Date: Jul. 22, 2010

(87) PCT Pub. No.: WO2009/110352
PCT Pub. Date: Sep. 11, 2009

(65) Prior Publication Data
US 2010/0300646 A1  Dec. 2, 2010

(30) Foreign Application Priority Data
Mar. 5, 2008  (JP) ................................. 2008-054180

(51) Int. Cl.
*B60K 11/00* (2006.01)

(52) U.S. Cl.
USPC ............................. 429/62; 429/120; 361/695

(58) Field of Classification Search
CPC ...................... H01M 10/5016; H01M 10/5004
USPC ...................................... 429/120, 62; 361/695
See application file for complete search history.

(56) References Cited

U.S. PATENT DOCUMENTS

| | | | |
|---|---|---|---|
| 5,834,132 A * | 11/1998 | Hasegawa et al. | 429/62 |
| 5,871,526 A * | 2/1999 | Gibbs et al. | 607/104 |
| 6,106,972 A * | 8/2000 | Kokubo et al. | 429/120 |
| 6,445,582 B1 * | 9/2002 | Oda et al. | 361/695 |
| 6,481,230 B2 | 11/2002 | Kimishima et al. | |
| 7,531,269 B2 | 5/2009 | Wegner | |
| 7,554,300 B2 | 6/2009 | Furukawa et al. | |
| 7,764,496 B2 * | 7/2010 | Nguyen et al. | 361/697 |
| 7,859,844 B2 * | 12/2010 | Nguyen et al. | 361/697 |
| 8,415,041 B2 * | 4/2013 | Eisenhour | 429/62 |
| 2002/0043413 A1 | 4/2002 | Kimishima et al. | |
| 2006/0078789 A1 | 4/2006 | Wegner | |
| 2006/0080986 A1 * | 4/2006 | Inoue | 62/259.2 |
| 2006/0169507 A1 | 8/2006 | Inoue et al. | |
| 2007/0018780 A1 | 1/2007 | Furukawa et al. | |
| 2009/0107657 A1 * | 4/2009 | Montminy et al. | 165/104.31 |
| 2009/0139781 A1 * | 6/2009 | Straubel | 180/65.1 |
| 2009/0145674 A1 * | 6/2009 | Lee et al. | 180/65.1 |
| 2009/0288390 A1 * | 11/2009 | Pavia et al. | 60/267 |
| 2010/0300646 A1 | 12/2010 | Sawaguchi et al. | 165/51 |
| 2011/0027640 A1 * | 2/2011 | Gadawski et al. | 429/120 |
| 2011/0200860 A1 * | 8/2011 | Brodie et al. | 429/120 |
| 2012/0241129 A1 * | 9/2012 | Kohl et al. | 165/58 |
| 2012/0263984 A1 * | 10/2012 | Krammer | 429/82 |
| 2013/0192272 A1 * | 8/2013 | Ranalli et al. | 62/3.3 |

FOREIGN PATENT DOCUMENTS

| | | |
|---|---|---|
| JP | 2002-191104 A | 7/2002 |
| JP | 2004-076603 A | 3/2004 |
| JP | 2005-534143 A | 11/2005 |
| JP | 2006-143183 A | 6/2006 |
| JP | 2006-216303 A | 8/2006 |
| JP | 2007-018826 A | 1/2007 |
| WO | WO 03/103083 A2 | 12/2003 |

* cited by examiner

*Primary Examiner* — Joseph S Del Sole
*Assistant Examiner* — Nahida Sultana
(74) *Attorney, Agent, or Firm* — Foley & Lardner LLP

(57) ABSTRACT

[Task] It is an object of the present invention to provide a vehicle battery cooling device even if a situation that cannot be compensated by ordinary cooling means occurs, the efficient cooling is performed and a battery temperature can be stabilized.

[Means for Solving] A cooling system of a heat exchanger 18 and a cooling system of a sub radiator 12 are provided to perform the cooling of high-power battery 6. A battery controller 31 which processes the information such as a temperature sensor 33 and so forth switches the device to perform the cooling of high-power battery 6 from the cooling system of heat exchanger 18 to the cooling system of sub radiator 12.

15 Claims, 4 Drawing Sheets

← FLOW AT A TIME OF TEMPERATURE RISE
◄-- FLOW AT AN ORDINARY TIME

← FLOW AT A TIME OF TEMPERATURE RISE
◄-- FLOW AT AN ORDINARY TIME

← FLOW AT A TIME OF TEMPERATURE RISE
←-- FLOW AT AN ORDINARY TIME

← FLOW AT A TIME OF TEMPERATURE RISE
←-- FLOW AT AN ORDINARY TIME

VEHICLE BATTERY COOLING DEVICE

TECHNICAL FIELD

The present invention belongs to a technical field of a vehicle battery cooling device.

BACKGROUND ART

A battery is, conventionally, cooled by means of a wind supply of a blower for cooling purpose (for example, refer to a patent document 1).

In addition, a circulating refrigerant is provided and is in a non-positive contact with the battery (for example, refer to a patent document 2 (patent document 2 corresponds to an international PCT Application Publication WO03/103083).

Patent document 1: JP(Tokkai) 2006-143183 Official Gazette (Pages 2 to 19, all drawings)

Patent document 2: JP(Tokuhyou) 2005-534143 Official Gazette (Pages 2 to 10, all drawings)

DISCLOSURE OF THE INVENTION

However, conventionally, when a temperature rise state that cannot be compensated by ordinary cooling means occurs, a degradation of the battery may be considered.

It is, with the above-described task in mind, an object of the present invention to provide a vehicle battery cooling device which is capable of stabilizing a temperature of the battery by efficiently cooling the battery when a situation that cannot be compensated by the ordinary cooling means occurs.

The above-described object can be achieved by providing a vehicle battery cooling device comprising: first cooling means and second cooling means, both means for cooling a battery of the vehicle; battery temperature estimating means for estimating a temperature of the battery; and switching control means for performing a switching from the first cooling means to the second cooling means when a determination is made that the battery indicates equal to or higher than a predetermined temperature by the battery temperature estimating means.

Thus, according to the present invention, when a situation that cannot be compensated by the ordinary cooling means, the cooling is efficiently performed and the battery temperature can be stabilized.

Figure 1:
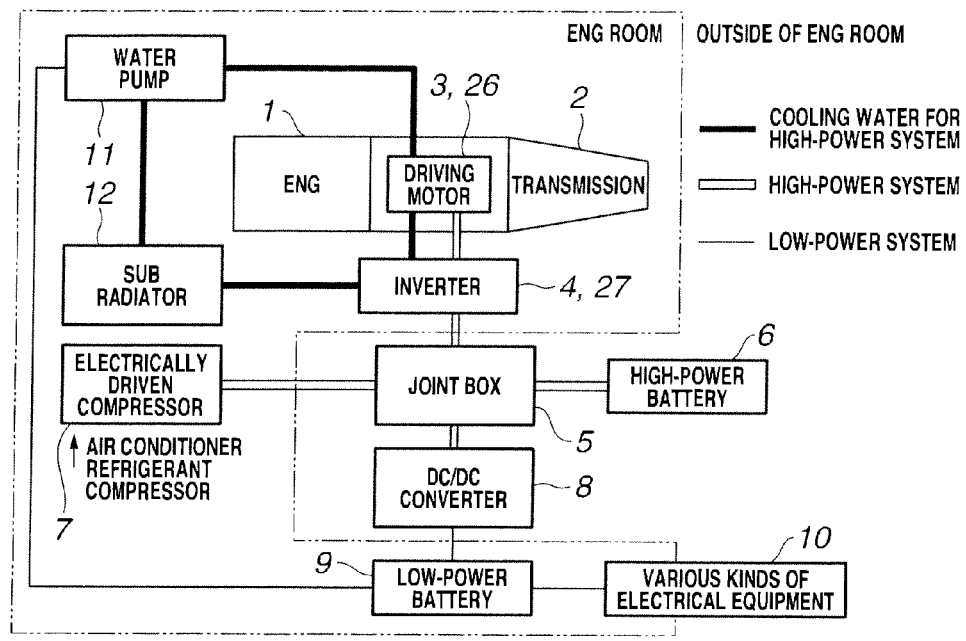
FIG. 1 is a rough electrical installation diagram of a hybrid vehicle in which a vehicle battery cooling device in a first preferred embodiment is used.

EXPLANATION OF SIGNS 1 engine
2 transmission
3 driving motor
4 inverter
5 joint box
6 high-power battery
7 electrically driven compressor
8 converter
9 low-power battery
10 various types of electrical appliances
11 water pump
12 sub radiator
13 cooling line
14 cooling line
15 electromagnetic valve
15 mid-way electromagnetic valve
16 electromagnetic valve
17 cold plate
18 heat exchanger
19 cooling line
20 cooling line
21 water pump
22 electromagnetic valve
23 electromagnetic valve
24 connection line
25 connection line
26 heat absorption section
27 heat absorption section
28 cooling line
31 battery controller
32 voltage sensor
33 temperature sensor
34 current sensor
41 cooling line
42 cooling line
51 cooling plate
61 casing
62 suction passage
63 blower
64 exhaust passage
65 cooling plate
201~204 arrow-marks

BEST MODE FOR CARRYING OUT THE INVENTION

Hereinafter, preferred embodiments of a vehicle battery cooling device according to the present invention will be described on a basis of a first preferred embodiment corresponding to the invention related to claims 1, 2, 3, 5, and 8, a second preferred embodiment corresponding to the invention related to claims 1 through 4, a third preferred embodiment corresponding to the invention related to claims 1 through 3 and 6, and a fourth preferred embodiment corresponding to the invention related to claims 1 and 7.

First Embodiment

First, a structure will be described.

FIG. 1 is a rough electrical installation diagram of a hybrid vehicle in which a vehicle battery cooling device in a first preferred embodiment is used. In the hybrid vehicle in which the vehicle battery cooling device in the first embodiment is used, a hybrid drive section in a series form or parallel form includes an engine 1, a transmission 2, and a driving motor 3 that are used.

First, a high-power system corresponding to a first power supply system according to the present invention will herein be described.

The high-power system in the rough structure shown in FIG. 1 including a driving motor 3, an inverter 4, such that a vehicular driving system according to the present invention includes both driving motor 1 and the inverter, a joint box 5, a high-power battery 6 corresponding to a battery according to the present invention, an electrically driven compressor 7, and a DC/DC converter 8.

Driving motor 3 is a three-phase coil motor and is driven with a connection thereof to inverter 4. Inverter 4 is connected to high-power battery 6 that performs an output eta high voltage via joint box 5 and that includes an assembled battery of, for example, as plurality of cell units. High-power battery 6 performs the power supply to driving motor 3 and an electric charge from driving motor 3. Furthermore, joint box 5 is connected to electrically driven compressor 7 and is driven by means of a vehicle air conditioning in response to the high voltage.

In addition, DC/DC converter 8 is connected to joint box 5, DC/DC converter 8 converts the high voltage to the low voltage to perform the power supply to a low-power system corresponding to a second power supply system according to the present invention.

Next, the low-power system will be described. The low-power system in the rough configuration view in FIG. 1 is constituted by low-power battery 9 and various kinds of electrical equipment 10. Low-power battery 9 performs electric charging through the power supply which is a conversion of a high voltage to a low voltage by means of DC/DC converter 8 and performs the power supply to various types of electrical equipment 10 and for an engine start in a case where a battery power interruption in the high-power system is carried out. Various types of electrical equipment 10 are operated upon receipt of the power supply of a low voltage from low-power battery 9 and DC/DC converter. Water pump 11 is used to circulate the refrigerant used in the cooling of the high-power system through the drive of the high-power system.

Next, a high-power cooling system corresponding to a second circulation circuit according to the present invention will herein he described. In the rough configuration in FIG. 1, the refrigerant radiated by a sub radiator 12 corresponding to second cooling means that comprise a second cooling member according to the present invention is supplied with water pump 11 corresponding to a second pump according to the present invention to cool driving motor 3 and inverter 4. Thus, the heat absorbed refrigerant is supplied to sub radiator 12. It should herein be noted that, in the rough configuration in FIG. 1, high-power battery 6, joint box 5, and DC/DC converter 8 are disposed outside of an engine room and the other components are disposed within the engine room.

Figure 2:
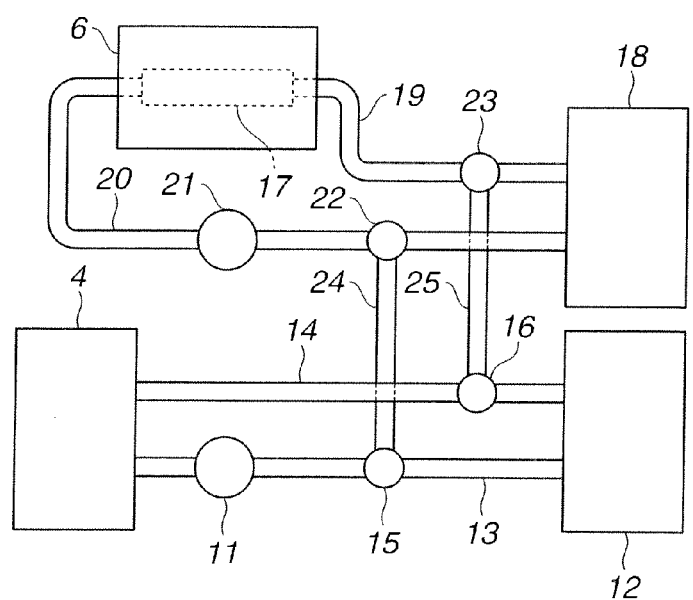
FIG. 2 is an explanation diagram of parts of the vehicle battery cooling device and a high-power cooling system in a first preferred embodiment according to the present invention.

FIG. 2 shows an explanatory view for parts of the vehicle battery cooling device and the high-power cooling system in the first embodiment. In the high-power cooling system in the first embodiment, reference is further made to FIG. 2 in addition to the rough configuration in FIG. 1. A part shown in FIG. 2 includes inverter 4, sub radiator 12, a cooling line 13, a cooling line 14, an electromagnetic valve 15, and an electromagnetic valve 16.

Inverter 4 and sub radiator 12 include: a cooling line 13 for supplying refrigerant from inverter 4 to sub radiator 12; and a cooling line 14 for supplying the refrigerant from sub radiator 12 to inverter 4. In addition, in a midway through cooling line 13, a water pump 11 is installed to circulate the refrigerant. In addition, these cooling lines 13, 14 cool drive motor 3 as well as inverter 4 as shown in FIG. 1 (omitted in FIG. 2).

Furthermore, electromagnetic valve 15 to connect connection line 24 to the battery cooling system and to switch the state in which cooling line 13 is connected or not connected to connection line 24 is installed in a midway through cooling line 13. In addition, electromagnetic valve 16 to connect a connection line 25 to the battery cooling system and to switch states in which cooling line 14 is connected or not connected to connection line 25 is provided.

Next, the battery cooling system in the first preferred embodiment corresponding to a first circulation circuit according to the present invention will be explained with reference to FIG. 2.

The battery cooling system includes: cold plate 17; heat exchanger 18 corresponding to first cooling means that comprise a first cooling member according to the present invention; cooling line 19; cooling line 20; water pump 21 corresponding to a first pump according to the present invention; electromagnetic valve 22; and electromagnetic valve 23, Cold plate 17 is disposed in a plate-like shape to make a plane-to-plane contact with high-power battery 6. For example, high-power battery 6 is mounted on cold plate 17 or so forth.

Furthermore, cold plate 17 serves to cool the battery, with the refrigerant supplied from cooling line 19 passed through the inside of the cold plate.

In addition, there are provided with a cooling line 19 supplying the refrigerant from cooling line 19 toward cold plate 17 and a cooling line 20 supplying the refrigerant toward heat exchanger 18, in the battery cooling system. A water pump 21 is installed in a midway through cooling line 20 to circulate the refrigerant.

Furthermore, in a midway through cooling line 19, there is provided with electromagnetic valve 23 in which connection line 25 to the high-power cooling system is connected and to switch the states in which cooling line 20 is connected to connection line 24 and in which cooling line 20 is not connected to connection line 25.

In addition, in a midway through cooling line 20, there is provided with an electromagnetic valve 22 to switch the states in which cooling line 20 is connected to connection line 24 and in which cooling line 20 is not connected to connection line 24.

Figure 3:
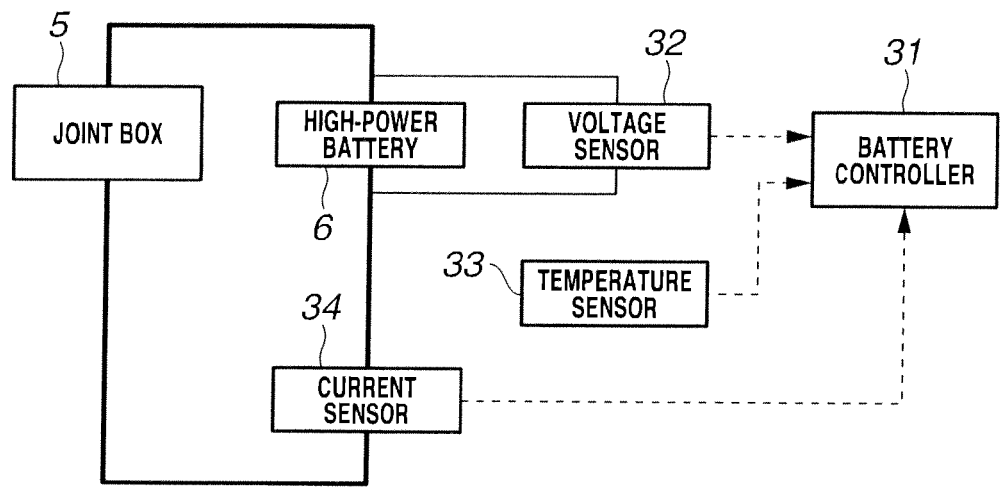
FIG. 3 is a block rough configuration view of a monitoring control of a high-power battery in the first preferred embodiment.

FIG. 3 shows a block diagram of a monitoring control for the high-power battery in the first preferred embodiment. High-power battery 6 in the first embodiment is connected to driving motor 3 via joint box 5. Terminal voltage is detected by means of a voltage sensor 32. A temperature sensor 33 detects a battery temperature. These sensor detection values are outputted to a battery controller 31. Battery controller 31 monitors and controls a state of batteries. In addition, battery controller 31 controls an on-and-off drive for electromagnetic valves 15, 16, 22, and 23.

Figure 4:
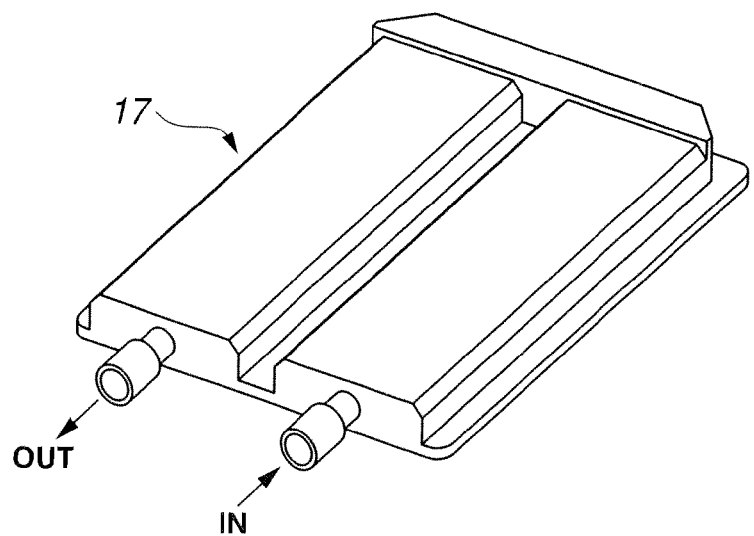
FIG. 4 is an explanatory view of a cold plate.

FIG. 4 shows an explanatory view of the cold plate. A specific example of cold plate 17 is shown in FIG. 4.

For example, cold plate 17 performs a heat exchange with high-power battery 6 by passing slowly the refrigerant within an inside of cold plate 17, with the refrigerant inputted and outputted from the inlet to the outlet and disposed on left and right sides thereof, while the refrigerant is passed slowly through the inside thereof in a letter of U shape and a predetermined quantity of the refrigerant is accommodated therein.

It should be noted that heat absorption section 27 of inverter 4 has the same structure as cold plate 17 and heat absorption section 26 of driving motor 3 takes a heat absorption structure by forming a flow passage which provides a passage of refrigerant at an inside of driving motor 3.

[Battery Temperature Stabilization Action at a Time of Temperature Rise]

Figure 5:
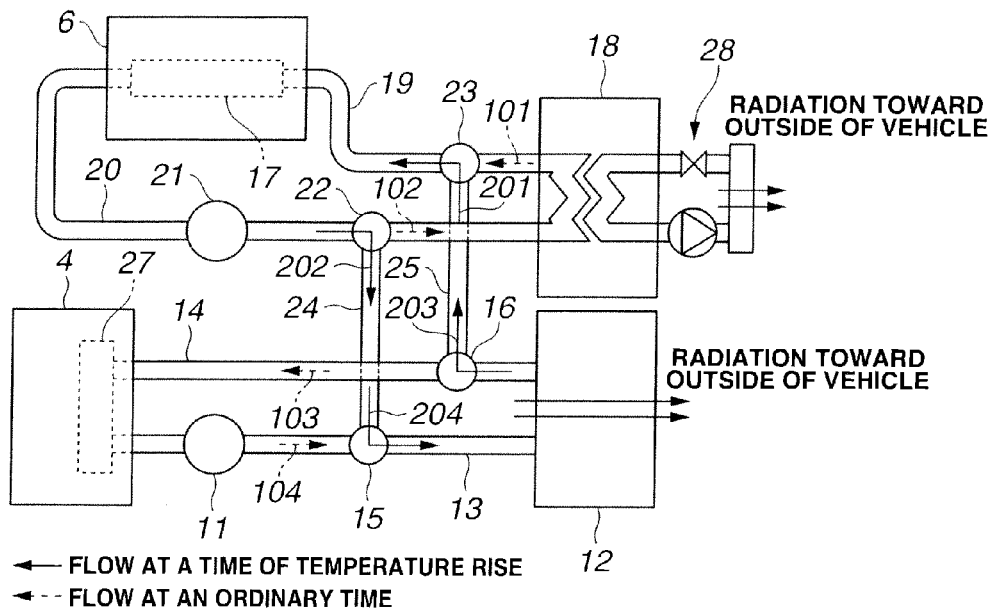
FIG. 5 is an explanatory view of two states of refrigerant flow in the vehicle battery cooling device in the first embodiment.

FIG. 5 is an explanatory view of the refrigerant flow in two states of the vehicle battery cooling device in the first embodiment.

(Ordinary Time)

During an ordinary time, the cooling is performed with the high-power cooling system and battery cooling system made independent from each other to perform the cooling, as shown in flows 101 through 104 in FIG. 5.

In the high-power cooling system at the ordinary time, the refrigerant outputted by water pump 11 is caused to flow into cooling line 13 and to pass through electromagnetic valve 15 in a midway therethrough. Electromagnetic valve 15 is caused to bring cooling line 13 in a non-connection state to connection line 24.

Then, a heat radiation to an outside of the vehicle is performed by sub radiator 12 and the refrigerant is cooled by passing the refrigerant through a heat radiation passage within sub radiator 12 from cooling line 13.

The refrigerant flowing through sub radiator 12 is supplied to cooling line 14 and is, in a midway therethrough, passed through electromagnetic valve 16. Electromagnetic valve 16 is in a state in which cooling line 14 is not connected to connection line 25. Then, the refrigerant is caused to flow through heat absorption section 13 to heat absorption section 26 of driving motor 3 and heat absorption section 27 of inverter 4 from cooling line 14 and is directed to water pump 11.

In the way described above, the high-power cooling system serves to cool inverter 4 and driving motor 3.

Next, the battery cooling system will herein be described below. In the battery cooling system during the ordinary time, the refrigerant supplied by water pump 21 is caused to flow through cooling line 20 and is passed through electromagnetic valve 22 in a midway therethrough. Electromagnetic valve 22 is made in a state in which cooling line 20 is not connected to connection line 24. Thereafter, the refrigerant is, in a midway therethrough, passed through electromagnetic valve 22. Electromagnetic valve 22 is in a state in which cooling line 20 is not connected to connection line 24. Then, the refrigerant is passed from cooling line 20 to an inside of heat exchanger 18. In heat exchanger 18, as shown in FIG. 5, a cooling line 28 for a vehicle air conditioning is incorporated. The heat exchange of the refrigerant to obtain the further lower temperature than the high-power cooling system is performed thereat.

Then, the refrigerant flowing into heat exchanger 18 is supplied to cooling line 19 and, in a midway therethrough, is passed through electromagnetic valve 23.

Electromagnetic valve 23 is made in a state in which cooling line 19 is not connected to connection line 25. Then, the refrigerant is caused to flow from cooling line 19 into an inside of cold plate 17 and is directed toward water pump 21. As described above, high-power battery 6 is cooled by means of the battery cooling system.

(During Temperature Rise)

In the first embodiment, battery controller 31 monitors a state of high-power battery 6 according to a battery temperature, an internal resistance, and an terminal voltage. Then, in a case where some abnormality in the battery cooling system is detected, particularly a battery temperature rise is detected and a determination is made that high-power battery 6 needs to be cooled, battery controller 31 causes to electromagnetic valve 15, electromagnetic valve 22, and electromagnetic valve 23 to be in operation.

At this time, electromagnetic valve 15 is operated so as to make cooling line 13 and connection line 24 connection state and, furthermore, electromagnetic valve 16 is operated so as to make cooling line 14 and connection line 25 connection state. In addition, electromagnetic line 22 is operated so as to make cooling line 20 and connection line 24 connection state and electromagnetic valve 23 is operated to make cooling line 19 and connection line 25 connection state.

Thus, the refrigerant passed through sub radiator 12 of the high-power cooling system is passed through connection line 25 from electromagnetic valve 16 (refer to an arrow mark 203 of FIG. 5) and is caused to flow through the battery cooling system from electromagnetic valve 23 (refer to an arrow mark 201 in FIG. 5). Then, the refrigerant passed through connection line 24 is caused to flow from electromagnetic valve 15 back to the high-power cooling system (refer to an arrow mark 204 in FIG. 5).

Therefore, when some abnormality in the battery cooling system occurs and, thus, the cooling of the battery becomes difficult to be carried out, the refrigerant of the high-power cooling system can be caused to flow and to be circulated so that the cooling of high-power battery can be carried out.

At this time, the temperature of high-power battery 6 can be stabilized. In addition, in a case where some abnormality of the high-power cooling system occurs, the refrigerant is caused to flow from the battery cooling system to be circulated to enable to cool inverter 4 and so forth. In this way, in the first embodiment, the cooling system becomes stable against the temperature rise.

If some abnormality such that the one cooling system cannot be maintained occurs, the refrigerant is supplied from the other system to obtain the performance more preferably.

In addition, in a case where some abnormality occurs in a system of high-power battery 6, battery controller 31 performs the control for the power supply from high-power battery 6 to be stopped. It should be noted that there are many cases where high-power battery 6 can wholly be used when this stop control is carried out.

If a determination is made that, although high-power battery 6 can be used, the power supply to the high-power system should be avoided, the power supply is carried out from high-power battery 6 to DC/DC converter 8 via joint box 5. Therefore, a modification of the cooling system of high-power battery 6 using the cooling system of sub radiator 12 can bring out a use of the vehicle in a tight manner even if such an inconvenience in the high-power system and in the low-power system occurs.

Advantages will be described below. The vehicle battery cooling system in the first embodiment has the following advantages.

(1) The cooling system of heat exchanger 18 and cooling system of sub radiator 12 have the cooling for high-power battery 6. When battery controller 31 processing the information of temperature sensor 33 so forth determines that the battery is equal to or higher than a predetermined temperature, a device to perform the cooling for high-power battery 6 is switched from the cooling system of heat exchanger 18 to the cooling system of sub radiator 12. Thus, even if a situation that cannot be compensated by the ordinary cooling means occurs, the cooling can efficiently be performed and the battery is temperature can be stabilized.

(2) As described in item (1), the vehicle power supply has at least two systems, an output of the high-power system being interrupted when high-power battery 6 becomes high temperature and the low-power system is a power supply system which is enabled to be outputted when the temperature becomes high.

If high-power battery 6 is determined to be equal to or higher than the predetermined temperature, the high-power system is interrupted. In turn, the cooling system of sub radiator 12 operating in the low-power system is operated. Thus, even if the power supply is interrupted by the high-power system, the low-power supply system interrupts the power supply.

Thus, the efficient cooling can be performed and the battery temperature can be stabilized even if the situation that cannot be compensated by the ordinary cooling means occurs.

(3) In the above-described (2), the high-power system is a system of high-power battery 6 from which the power supply to driving motor 3 of the vehicle is performed and the low-power system is a system of a low voltage low-power battery 9 used for a vehicle accessory purpose. Since electrically driven compressor 7 in the cooling system of heat exchanger 18 is operated in the high-power system of heat exchanger 18 and the cooling system of sub radiator 12 is operated in the low-power system.

Even if the power supply to high-power battery 6 is reduced or stopped, high-power battery 6 can be cooled in the cooling system of sub radiator 12 operating in the low-power system. When a situation that cannot be compensated by the ordinary cooling means occurs, the efficient cooling is performed so that the battery temperature can be stabilized.

In the above items of (1) through (3), a circulation circuit including at least two heat exchangers of cold plate 17 contacted with high-power battery 6 and which absorbs heat of high-power battery 6 and heat exchanger 18 which radiates the absorbed heat externally is interconnected using cooling lines 19, 20. Cold plate 17 is heat exchangeably installed with heat exchanger 18. Heat exchanger 18 is heat exchangeably installed with respect to cooling line 28 for the vehicle air conditioning. In the ordinary cooling, hence, the heat exchange with cooling line 28 for the vehicular air conditioning is performed by heat exchanger 18. A very high cooling performance is, thus, obtained by performing the heat exchange with cooling line 28 for the vehicle air conditioning. Cold plate 17 contacted with high-power battery 6 can perform the cooling to a very high degree. The temperature of high-power battery 6 can be maintained in a favorable state.

The battery cooling device for the automotive vehicle in which operations of engine 1 and driving motor 3 are switched, the high-power system being high-power battery 6 used for the drive of the vehicle and the low-power system being low-power battery 9 used for the power supply for accessories, and the high-power system being switched to an engine drive with the output thereof interrupted when some abnormality is detected in high-power battery 6. Electrically driven compressor 7 used for the heat exchange of heat exchanger 18 is operated in the high-power system. The cooling system of sub radiator 12 is operated under a low-power system. When the interruption of the low-power system is detected, the switching is made from the operation of the cooling system of heat exchanger 18.

Thus, even if the power supply is interrupted by the high-power system, the low-power system operates the cooling system of sub radiator 12.

Even if a situation that cannot be compensated by the ordinary cooling means occurs, the efficient cooling is achieved and the battery temperature can be stabilized. Thus, even if some inconveniences occur, driving motor 3 can be used in the vehicle with high persistence.

Second Embodiment

In a second preferred embodiment, the cooling line of the high-power cooling system is disposed in an inside of heat exchanger 18 of the battery cooling system. Its structure will herein be described.

Figure 6:
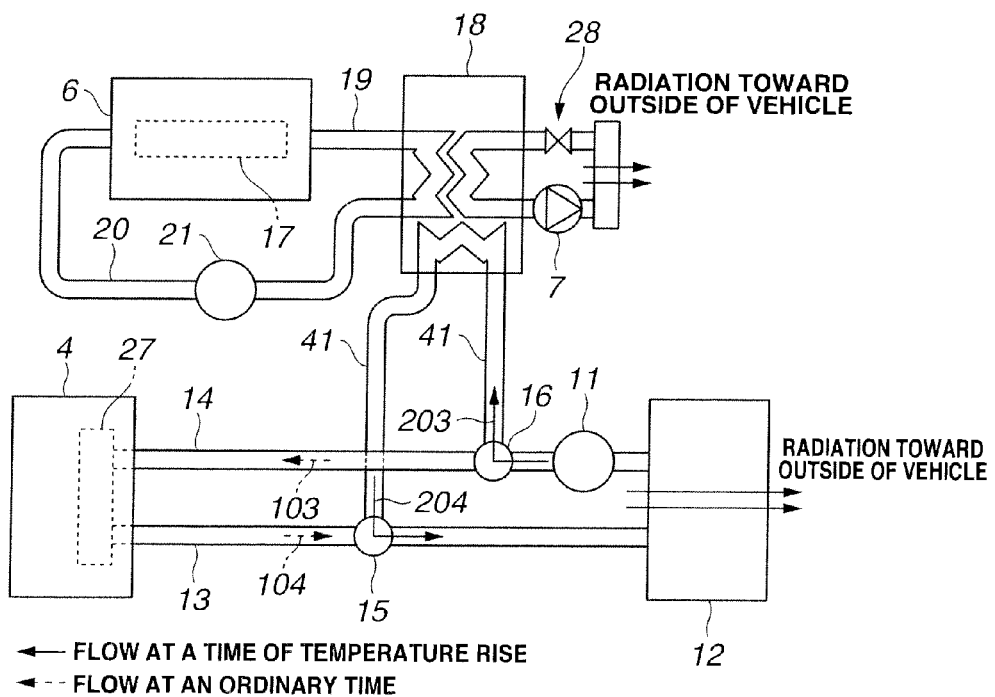
FIG. 6 is an explanatory view of a structure of the vehicle cooling device in a second preferred embodiment and two states of flow of refrigerant.

FIG. 6 shows an explanatory view for explaining the structure of the vehicle battery cooling device in the second embodiment and two states of the refrigerant flow. In the second embodiment, a cooling line 41 is disposed which is branched from a line in a midway through cooling line 14 at the high-power system cooling side and which is branched from a line in a midway through cooling line 13, respectively. The heat exchange with the cooling line of the battery is performed by cooling line 41 at the inside of heat exchanger 18. Electromagnetic valve 15 switches the connection state And non-connection state between cooling line 13 and Cooling line 41. In addition, electromagnetic valve 16 switches between connection state and non-connection state of cooling line 14 and cooling line 41.

Furthermore, water pump 11 is disposed on cooling line 14 between electromagnetic valve 16 and sub radiator 12. In addition, the cooling line of the battery constituted by cooling lines 19 and 20 is disposed so as to enable the heat exchange between cooling line 28 for a vehicle air conditioning and cooling line 41. It should be noted that the battery cooling system is configured in such a way that the refrigerant is independently circulated without connection of the connection line and installation of the electromagnetic valves.

The other structures are the same as those in the first embodiment and their explanations will herein be omitted.

An action will be described.
[Battery Temperature Stabilization Action at a Time of Temperature Rise]
(Ordinary Time)

The high-power cooling system and the battery cooling system are, respectively, made independent from each other to perform the cooling at the ordinary time. Electromagnetic valve 16 is made in a state in which cooling line 14 is not connected with cooling line 14 to heat absorption section 26 of driving motor 3 and the refrigerant is caused to flow into heat absorption section 26 of driving motor 3 and the refrigerant is caused to flow into heat absorption section 27 of inverter 4 and is directed toward cooling line 13.

In addition, the refrigerant is caused to flow through cooling line 13 and, in the midway therethrough, passes electromagnetic valve 15. Electromagnetic valve 15 serves to make no connection state of cooling line 14 to cooling line 41. Then, the refrigerant is caused to flow through cooling line 13 and is passed through a heat radiation passage within sub radiator 12. Sub radiator 12 performs a heat radiation toward an outside of the vehicle and the refrigerant is cooled. Next, the refrigerant flowing through sub radiator 12 is supplied to cooling line 14 and is directed from cooling line 14 to water pump 11. In the way described above, both of inverter 14 and driving motor 3 are cooled by means of the high-power cooling system.

Next, the battery cooling system will, herein, be described below. In the battery cooling system, streams of the refrigerant during the ordinary time and during the temperature rise are mutually the same.

The refrigerant fed out through water pump 21 is caused to flow through cooling line 20 and is passed within heat exchanger 18. In heat exchanger 18, as shown in FIG. 6, cooling line 28 for the vehicle air conditioning and cooling line 41 in high-power cooling system are incorporated to perform the heat exchange for either one of cooling lines 28 and 41.

At the ordinary time, the heat exchange with cooling line 28 for the vehicle air conditioning is carried out at the ordinary time so that the heat exchange of the refrigerant for the high-power cooling system is carried out so that the further lower temperature is enabled.

Then, the refrigerant flowing through heat exchanger 18 is supplied to cooling line 19 and is supplied toward water pump 21 via the inside of cold plate 17 and directed toward water pump 21. In this way, high-power battery 6 is cooled by means of battery cooling system.

(During Temperature Rise)

In the second embodiment, battery controller 18 monitors the state of high-power battery 6 according to the battery temperature, an internal resistance, and a terminal voltage. Then, if some abnormality in the battery cooling system occurs, particularly in a case where the battery temperature rise is detected and a determination is made that high-power battery 6 needs to be cooled, battery controller 31 operates electromagnetic valves 15 and 16.

Then, electromagnetic valve 15 is operated and connection states between cooling lines 13 and 41 are made and electromagnetic valve 16 is operated to make cooling line 14 and cooling line 41 connection state.

Thus, the refrigerant passed through sub radiator 12 of the high-power cooling system is passed from electromagnetic valve 16 to cooling line 41 (refer to an arrow mark 203 in FIG. 6) and the internal of heat exchanger 18 in the battery cooling system is caused to flow into heat exchanger 18. It should, herein, be noted that the internal of heat exchanger 18 performs the heat exchange with the internal of heat exchanger 18 of cooling lines 19, 20 to cool high-power battery 6. In this way, the refrigerant by which the heat exchange with heat exchanger 18 is caused to flow into cooling line 41 and the flow from electromagnetic valve 15 back to the high-power cooling system is resulted (refer to an arrow mark 204 in FIG. 6).

Therefore, even in a case where some abnormality occurs in the battery cooling system and the cooling of the battery cannot preferably be performed and the heat exchange with heat exchanger 18 is carried out, the heat exchange with the inside of heat exchanger 18 is carried out. In this way, the temperature of high-power battery 6 becomes stabilized.

In addition, in the second embodiment, both of the battery cooling system of high-power battery 6 and the high-power cooling system such as inverter 4 are so structured that the refrigerant does not mix with each other. Thus, wholly different refrigerants may be used for the respective battery systems. Since target cooling temperatures, thermal capacities, anti-droplet sensitivity, and so forth are different in the battery cooling system and the high-power cooling system, it is advantageous that, in one of the battery cooling system and the high-power cooling system, the other cooling system can be cooled while the refrigerant suitable for each of these characteristics is used.

The advantages will, herein, be described. In the vehicle cooling system in the second embodiment, the following advantages can be obtained.

(4) In the above-described items (1) through (3), the circulation circuit including at least two heat exchangers of cold plate 17 which is contacted with high-power battery 6 and absorbs heat from high-power battery 6 and heat exchanger 18 which radiates the absorbed heat to an external portion is constituted by cooling lines 19, 20. In heat exchanger 18, the cooling line of the battery cooling system is heat exchangeably installed for both of cooling line 28 for the vehicle air conditioning and cooling line 41 in the high-power cooling system such as inverter 4 in the inside of heat exchanger 18. The battery cooling system in heat exchanger 18 is heat exchanged with cooling line 28 for the vehicle air conditioning or cooling line 41 of the high-power cooling system. Thus, even if a situation that cannot be compensated by the ordinary cooling means is brought out, an efficient cooling can be carried out to stabilize the battery temperature.

In addition, while the refrigerant which has no compatibility between the high-power cooling system and the battery cooling system can be used, one of the respective systems can cool the other system. The other action and advantages described above are the same as those in the first embodiment and, thus, the explanations thereof will herein be omitted.

Third Embodiment

Figure 7:
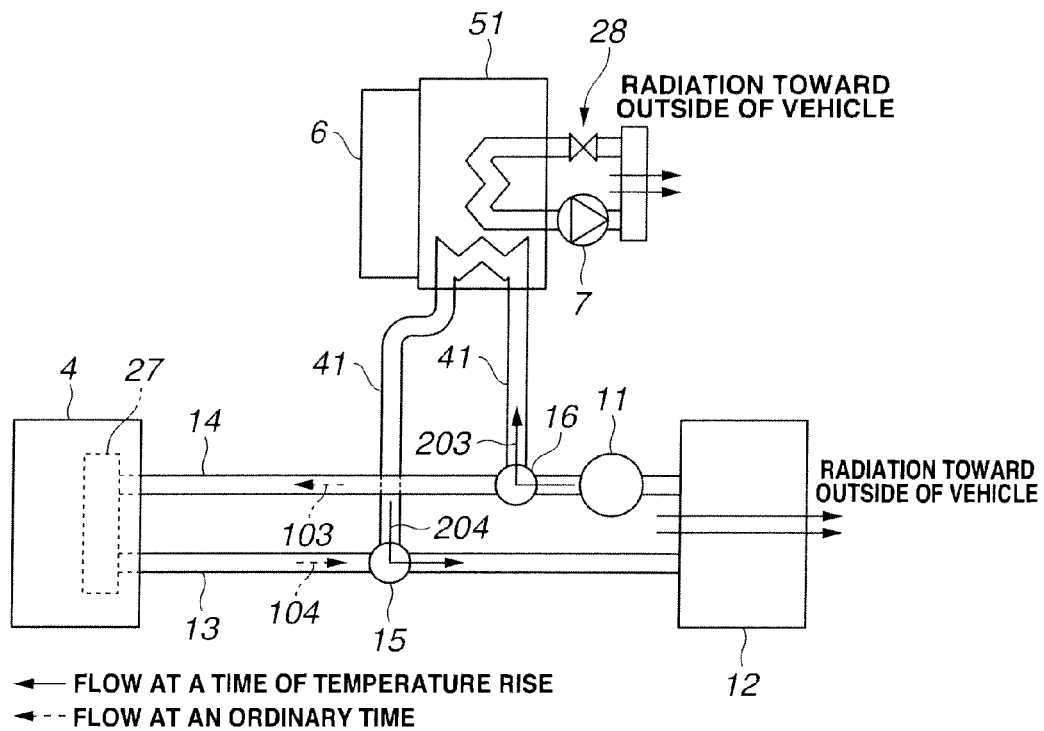
FIG. 7 is an explanatory view of the structure of the vehicle battery cooling device in a third preferred embodiment and two states of flow of the refrigerant.

A third preferred embodiment is an example in which a cooling of the cold plate is switched and which is contacted with high-power battery.6. A structure thereof will be described. FIG. 7 shows a structure of the vehicle battery cooling device in the third preferred embodiment and an explanatory view for explaining two states of the flow of refrigerant. In the third embodiment, in the battery cooling system, cooling plate 51 is contacted against high-power battery 6. Cooling line 28 for the vehicle air conditioning and cooling line 41 branched from high-power cooling system are caused to pass through an inside of cooling plate 51 so that high-power battery 6 is cooled by cooling line 41 of the high-power cooling system and cooling line of the vehicle air conditioning are directly cooled. The other structures are the same as those of the second embodiment and its explanations will be omitted herein.

The action of the third embodiment will be explained herein.

[Battery Temperature Stabilization Action at the Time of Temperature Rise]

(Ordinary Time)

At the ordinary time, the cooling is performed with the high-power cooling system and the battery cooling system made independent from each other.

In the high-power cooling system at the ordinary time, the refrigerant outputted by water pump 11 is caused to flow through cooling line 14 and is passed through electromagnetic valve 16. Electromagnetic valve 16 is made in a state in which cooling line 14 is not connected with cooling line 41. Then, the refrigerant is caused to flow from cooling line 14 to heat absorption section 26 of driving motor 3 and to heat absorption section 27 of inverter 4.

Then, the refrigerant is caused to flow through cooling line 13 and is passed through electromagnetic valve 15 in the midway therethrough.

Electromagnetic valve 15 is made in a state in which cooling line 13 is not connected with cooling line 41. Then, the refrigerant is caused to flow through cooling line 13 and is passed through a heat radiation passage within sub radiator 12 so that the heat radiation is performed to an outside of the vehicle so that sub radiator 12 cools the refrigerant.

Next, the refrigerant flowing through sub radiator 12 is supplied to cooling line 14 and, then, is directed to water pump 11 from cooling line 14. In this way, the high-power cooling system cools inverter 4 and driving motor 3.

Next, the battery cooling system will herein be explained.

The battery cooling system is so structured that cooling line 28 for the vehicle air conditioning and cooling line 42 for the high-power battery are in the power supply system.

In the high-power cooling system are passed through the inside of cooling plate 51 installed with the contact of high-power battery 6 in the battery cooling system. During the ordinary time, cooling line 28 for the vehicle air conditioning cools cool plate 51 so as to absorb the heat generation of high-power battery 6. In this way, high-power battery 6 is cooled by means of the battery cooling system.

(Temperature Rise Time)

In the third embodiment, battery controller 31 monitors the state of high-power battery 6 according to the battery temperature, the internal resistance, and the inter-terminal voltage. Then, in a case where some abnormality in the cooling system of the battery, particularly, the battery temperature rise is detected by means of battery controller 31 and the determination is made that high-power battery 6 is needed to be cooled, electromagnetic valve 15 and electromagnetic valve 16 are operated by battery controller 31.

At this time, electromagnetic valve 15 is operated, cooling line 13 and cooling line 14 are made in the state in which both thereof are interconnected. Furthermore, electromagnetic valve 16 is operated so that cooling line 14 is connected to cooling line 41.

The refrigerant passed through sub radiator 12 in the high-power cooling system is passed through cooling line 41 from electromagnetic valve 16 (refer to arrow mark 203 in FIG. 7) and is caused to flow through the inside of cooling plate 51 of the battery cooling system. Then, cooling plate 51 is cooled so that cooling plate 51 absorbs the heat generation of high-power battery 6. In this way, the refrigerant cooled by cooling plate 51 is caused to flow through cooling line 41 and is caused to flow back through the high-power cooling system from electromagnetic valve 15 (refer to arrow mark 204 in FIG. 7).

Therefore, when some abnormality occurs in the battery cooling system and the cooling of the battery is not performed well, cooling line 41 in the high-power cooling system directly cools high-power battery 6 so that a more efficient cooling is performed. The heat generation of high-power battery 6 is absorbed and the temperature of high-power battery 6 is stabilized. In the third embodiment, cooling line 28 for the vehicle air conditioning and cooling line 41 of the high-power cooling system directly cool high-power battery 6 so that the more efficient cooling is performed.

Advantages of the third embodiment will herein be described. In the vehicle battery cooling device in the third embodiment, the following advantages are provided in addition to the above-described items (1) through (3).

(6) In the above-described items (1) through (3), cooling plate 51 integrally including at least two heat exchange portions of a contact portion against high-power battery 6 of cooling plate 51 at which the heat of high-power battery 6 is contacted and a heat exchange portion of cooling plate 51 at which the absorbed heat is radiated externally is provided. Cooling plate 51 is heat exchangeably installed with cooling line 28 for the vehicle air conditioning and cooling line 41 branched from the high-power cooling system.

Hence, cooling plate 51 which absorbs the heat of the battery heat generation with contact against high-power battery 6 is heat exchanged with cooling line 28 for the vehicle air conditioning or cooling line 41 of the high-power cooling system. When a situation that cannot be compensated by the ordinary cooling means occurs, the efficient cooling can be achieved and the battery temperature can be stabilized.

In addition, a more direct battery cooling can be Performed and the efficient cooling can be performed. The other action and advantages are the same as those described in the second embodiment and its explanations will herein be omitted.

Fourth Embodiment

The vehicle battery cooling device in the fourth embodiment is an example for switching the cooling of high-power battery 6 from a wind supply.

The structure will be described.

Figure 8:
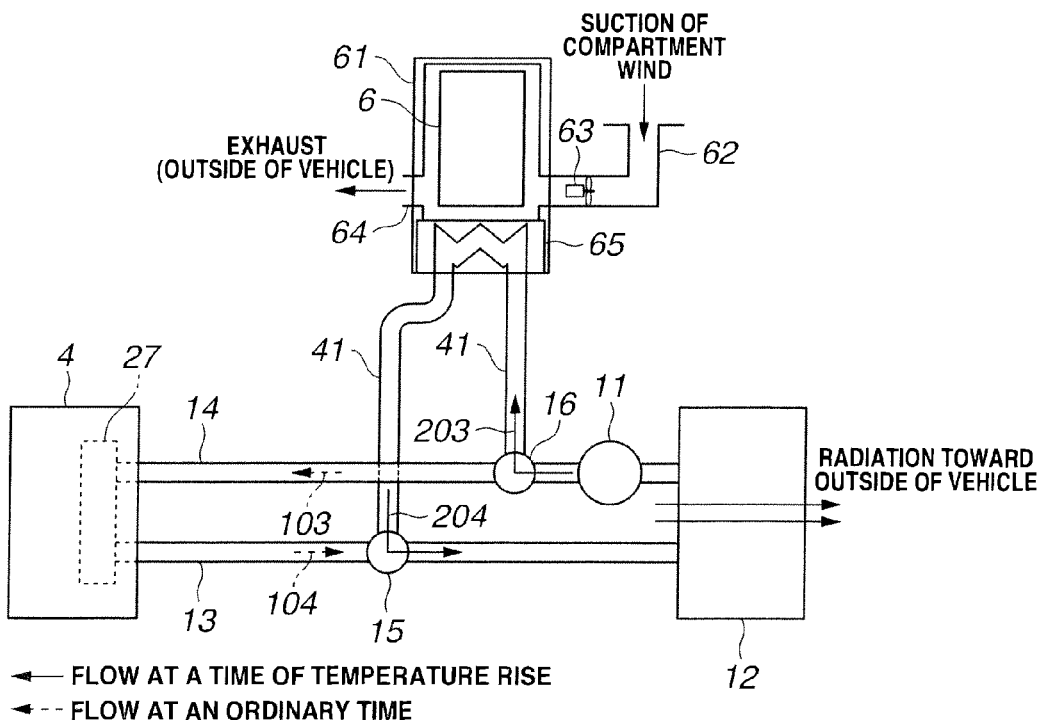
FIG. 8 is an explanatory view of the structure of the vehicle battery cooling device in a fourth preferred embodiment and two states of flow of the refrigerant.

FIG. 8 shows an explanatory view of the structure of the vehicle battery cooling device in the fourth embodiment and two states of the refrigerant flows.

In the fourth embodiment, the battery cooling system is structured on which high-power battery 6 is housed in the inside of casing 61 and a heat absorption passage 62 through which air is taken in from the inside of the vehicle passenger compartment to the inside of casing 61 is installed. Then, in a midway through heat absorption passage 62, a blower 63 is installed which supplies air within a vehicle compartment forcefully into an inside of casing 61. Furthermore, an exhaust passage 64 which exhausts air at an inside of casing 61 to an external of the vehicle is installed.

Furthermore, a cooling plate 65 which performs the heat exchange with contact against high-power battery 6 is installed in the inside of casing 61. Then, cooling line 41 branched from the high-power cooling system is caused to pass through cooling plate 65 installed of this casing 61 and is configured to cool high-power battery 6 via cooling plate 65. The other structure is the same as that in the second embodiment and its explanation will herein be omitted.

The action will herein be explained.

[Battery Temperature Stabilization Action During the Temperature Rise]

(Ordinary Time)

The cooling is performed at the ordinary time with the high-power cooling system and the battery cooling system made independent from each other. The refrigerant outputted by water pump 11 is caused to flow through cooling line 14 and is caused to be made in a state in which cooling line 14 is not connected to cooling line 14. Then, the refrigerant is cased to flow through cooling line 14, heat radiation passage 26 of driving motor 3, heat absorption passage 27 of inverter 4 and is directed toward cooling line 13.

Then, the refrigerant is caused to flow through cooling line 13 and is passed through electromagnetic valve 15, in the midway therethrough.

Electromagnetic valve 15 is made in a state in which cooling line 13 is not connected with cooling line 41. Then, the refrigerant is caused to flow through cooling line 13 and is caused to pass through the radiation passage within sub radiator 12 so that sub radiator 12 performs the heat radiation to the outside of the vehicle and the refrigerant is cooled. Next, the refrigerant flowing through sub radiator 12 is supplied to cooling line 14. Then, the refrigerant is caused to flow through refrigerant to water pump 11. In this way, the high-power cooling system cools inverter 4 and driving motor 3.

Next, the battery cooling system will be described below. In the battery cooling system, blower 63 forcefully supplies air within the passenger compartment to casing 61 into which high-power battery 6 is housed to perform the cooling for high-power battery 6. The air which absorbs heat for the battery generation is exhausted to the outside of the vehicle via exhaust passage 64. In this way, high-power battery 6 is cooled according to the battery cooling system.

(Temperature Rise Time)

In the third embodiment, battery controller 31 monitors the state of high-power battery 6 according to the battery temperature, the internal resistance, and the terminal voltage TE. Then, in a case where battery controller 31 detects some abnormality in the battery cooling system, particularly detects the temperature rise in the battery and determines that it is necessary to cool high-power battery 6, battery controller 31 operates electromagnetic valves 15 and 16.

At this time, electromagnetic valve 15 is operated so that cooling line 13 is made in connection state with cooling line 41 and, furthermore, electromagnetic valve 16 is operated so that cooling line 14 is made in a connection state with cooling line 41.

Thus, the refrigerant passed through sub radiator 12 in the high-power cooling system is passed from electromagnetic valve 16 through cooling line 41 (refer to an arrow mark 203 in FIG. 8) and is caused to follow through cooling plate 65 installed in an inside of casing 61 via cooling line 41 (refer to an arrow mark of 203 in FIG. 8). Then, cooling plate 65 is cooled. Cooled cooling plate 65 is contacted with high-power battery 6 so that the heat generation of high-power battery 6 is absorbed. In this way, the refrigerant cooling high-power battery 6 via cooling plate 65 installed at an inside of casing 61 is caused to flow through cooling line 41 so as to provide a flow returning from electromagnetic valve 15 to high-power cooling system (refer to arrow mark 204 in FIG. 8).

Therefore, when the abnormality occurs in the battery cooling system and the cooling of the battery is not performed well, cooling line 41 in the high-power cooling system causes the cooling for cooling plate 65 installed in casing 61 housed in the inside of high-power battery 6 by means of cooling line 41 in the high-power cooling system. Thus, the heat generation of high-power battery 6 is absorbed so that the temperature of high-power battery 6 is stabilized.

Advantages will hereinafter be described. The following effects can be obtained in addition to the above-described item (1).

In the above-described item (1), the first cooling means is a cooling supplying the air within the passenger compartment into blower 63 in a field of winding of the aircraft. The second cooling means is a refrigerant circulation passage including cooling plate 65 installed within the inside of casing 61 so as to be contacted with high-power voltage battery 6 and cooling line 41 which passes its internal of cooling plate 61.

Hence, cooling plate 65 to absorb the heat of the battery heat generation with the contact against high-power battery 6 performs the heat exchange with cooling line 41 of high-power cooling system. Thus, when a situation that cannot be compensated by the ordinary air cooling occurs, the efficient cooling is performed so that the battery temperature can be stabilized.

As described hereinabove, the vehicle battery cooling device has been explained on a basis of the first through fourth preferred embodiments. Specific structures are not limited to these embodiments. The design modifications, additions, and so forth are permitted unless the gist of invention related to each of claims recited in what is claimed is deviated.

For example, the structure having the low-power battery in FIG. 1 of the first embodiment has been described. However, the structure having no low-power battery may be accepted.

For example, in the third embodiment, a contact portion that performs the heat exchange with high-power battery 6 and the heat exchange portions with the cooling lines of the two systems are integrally installed. However, they may be separated and independent from each other via a heat transmission medium.

For example, in each of the preferred embodiments, in a state of the switching in the cooling line by means of the electromagnetic valve, in a state where the refrigerant is connected to the branched cooling line or connection line, the refrigerant may be caused to flow into the original cooling line or the refrigerant may not be caused to flow through the original cooling line. These may be determined depending on whether the system permits.

The invention claimed is:

1. A vehicle battery cooling device comprising:
a first cooling member actuated by a first power supply system comprising a high-voltage power supply that supplies power to a vehicular driving system and configured to cool a battery that supplies an electric power to the vehicular driving system;
a second cooling member actuated by a second power supply system comprising a low-voltage power supply that supplies power to accessories of a vehicle and configured to cool the vehicular driving system, and
a battery temperature detecting member configured to detect a temperature of the battery,
wherein, when the temperature of the battery becomes equal to or higher than a predetermined value, the second cooling member stops cooling of the vehicular driving system and carries out cooling of the battery.

2. A vehicle battery cooling device comprising:
a first cooling member actuated by a first power supply system comprising a high-voltage power supply that supplies power to a vehicular driving system and configured to cool a battery that supplies an electric power to the vehicular driving system;
a second cooling member actuated by a second power supply system comprising a low-voltage power supply that supplies power to accessories of a vehicle and configured to cool the vehicular driving system; and
a battery temperature detecting member configured to detect a temperature of the battery, wherein, when the temperature of the battery detected by the battery temperature detecting member becomes equal to or higher than a predetermined value, the first power supply system interrupts a supply of power and the second cooling member carries out cooling of the battery.

3. A vehicle battery cooling device comprising:
a first cooling member actuated by a first power supply system comprising a high-voltage power supply that supplies power to a vehicular driving system and configured to cool a battery that supplies an electric power to the vehicular driving system;
a second cooling member actuated by a second power supply system comprising a low-voltage power supply that supplies power to accessories of a vehicle and configured to cool the vehicular driving system; and
a battery temperature detecting member configured to detect a temperature of the battery, wherein, when the temperature of the battery detected by the battery temperature detecting member becomes equal to or higher than a predetermined value, the first power supply system interrupts a supply of power, and the second cooling member stops cooling of the vehicular driving system and carries out cooling of the battery.

4. A vehicle battery cooling device as claimed in claim 1, wherein the vehicle battery cooling device further comprises:
a battery heat exchanger that contacts the battery to absorb heat of the battery; and
a circulation circuit having at least two heat exchangers which radiate the absorbed heat to an external portion, wherein the at least two heat exchangers are heat exchangeably installed for the first cooling member and for the second cooling member.

5. A vehicle battery cooling device as claimed in claim 1, wherein the vehicle battery cooling device further comprises:
   a battery heat exchanger that contacts the battery and which absorbs heat of the battery; and
   a circulation circuit including at least first and second heat exchangers which radiate the absorbed heat to an external portion, the first heat exchanger being heat exchangeably installed for the first cooling member and the second heat exchanger being heat exchangeably installed for the second cooling member.

6. A vehicle battery cooling device as claimed in claim 1, wherein the vehicle battery cooling device further comprises:
   a battery heat exchanger contacted with the battery and which absorbs heat of the battery; and
   a circulation circuit including at least two heat exchangers which radiate the absorbed heat to an external portion, the at least two heat exchangers being heat exchangeably installed for the first cooling member and the second cooling member.

7. A vehicle battery cooling device as claimed in claim 1, wherein the first cooling member is a cooling spraying of an indoor wind to the battery and the second cooling member is a refrigerant circuit including a battery heat exchanger that contacts the battery and a heat radiator.

8. A vehicle battery cooling device for a vehicle configured to switch an operation of an engine and a driving motor, the vehicle battery cooling device comprising:
   a first power supply system being a high-voltage power supply for an application to a vehicle drive apparatus,
   a second power supply system being a low-voltage power supply system for an accessory, the first power supply system having an output to be interrupted when some abnormality is detected in the battery to be switched to an engine drive,
   a refrigeration cycle compressor operated in the first power supply system,
   a first cooling member, and
   a second cooling member operated in a second power supply system,
   wherein an operation of the first cooling member is switched to an operation of the second cooling member when an interruption of the first power supply system is detected.

9. A vehicle battery cooling device as claimed in claim 2, wherein the vehicle battery cooling device further comprises:
   a battery heat exchanger that contacts the battery to absorb heat of the battery; and
   a circulation circuit having at least two heat exchangers which radiate the absorbed heat to an external portion,
   wherein the at least two heat exchangers are heat exchangeably installed for the first cooling member and for the second cooling member.

10. A vehicle battery cooling device as claimed in claim 3, wherein the vehicle battery cooling device further comprises:
    a battery heat exchanger that contacts the battery to absorb heat of the battery; and
    a circulation circuit having at least two heat exchangers which radiate the absorbed heat to an external portion,
    wherein the at least two heat exchangers are heat exchangeably installed for the first cooling member and for the second cooling member.

11. A vehicle battery cooling device as claimed in claim 2, wherein the vehicle battery cooling device further comprises:
    a battery heat exchanger that contacts the battery and which absorbs heat of the battery; and
    a circulation circuit including at least first and second heat exchangers which radiate the absorbed heat to an external portion, the first heat exchanger being heat exchangeably installed for the first cooling member and the second heat exchanger being heat exchangeably installed for the second cooling member.

12. A vehicle battery cooling device as claimed in claim 3, wherein the vehicle battery cooling device further comprises:
    a battery heat exchanger that contacts the battery and absorbs heat of the battery; and
    a circulation circuit including at least first and second heat exchangers which radiate the absorbed heat to an external portion, the first heat exchanger being heat exchangeably installed for the first cooling member and the second heat exchanger being heat exchangeably installed for the second cooling member.

13. A vehicle battery cooling device as claimed in claim 8, wherein the vehicle battery cooling device further comprises:
    a battery heat exchanger that contacts the battery and which absorbs heat of the battery; and
    a circulation circuit including at least first and second heat exchangers which radiate the absorbed heat to an external portion, the first heat exchanger being heat exchangeably installed for the first cooling member and the second heat exchanger being heat exchangeably installed for the second cooling member.

14. A vehicle battery cooling device as claimed in claim 2, wherein the vehicle battery cooling device further comprises:
    a battery heat exchanger contacted with the battery and which absorbs heat of the battery; and
    a circulation circuit including at least two heat exchangers which radiate the absorbed heat to an external portion, the at least two heat exchangers being heat exchangeably installed for the first cooling member and the second cooling member.

15. A vehicle battery cooling device as claimed in claim 3, wherein the vehicle battery cooling device further comprises:
    a battery heat exchanger contacted with the battery and which absorbs heat of the battery; and
    a circulation circuit including at least two heat exchangers which radiate the absorbed heat to an external portion, the at least two heat exchangers being heat exchangeably installed for the first cooling member and the second cooling member.

* * * * *